(12) United States Patent
Kim et al.

(10) Patent No.: US 10,316,941 B2
(45) Date of Patent: Jun. 11, 2019

(54) TRANSMISSION FOR VEHICLES

(71) Applicants: HYUNDAI MOTOR COMPANY, Seoul (KR); KIA MOTORS CORPORATION, Seoul (KR)

(72) Inventors: Ki Tae Kim, Incheon (KR); Seong Wook Hwang, Gunpo-si (KR); Hyun Sik Kwon, Seoul (KR); Won Min Cho, Hwaseong-si (KR); Jae Chang Kook, Hwaseong-si (KR); Seong Wook Ji, Gunpo-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 15/808,378

(22) Filed: Nov. 9, 2017

(65) Prior Publication Data

US 2018/0363736 A1 Dec. 20, 2018

(30) Foreign Application Priority Data

Jun. 19, 2017 (KR) ........................ 10-2017-0077039

(51) Int. Cl.
*F16H 3/62* (2006.01)
*F16H 3/66* (2006.01)

(52) U.S. Cl.
CPC ..... *F16H 3/666* (2013.01); *F16H 2200/0069* (2013.01); *F16H 2200/2015* (2013.01); *F16H 2200/2046* (2013.01)

(58) Field of Classification Search
CPC .... F16H 3/62; F16H 3/666; F16H 2200/0069; F16H 2200/2015; F16H 2200/2046
See application file for complete search history.

(56) References Cited

U.S. PATENT DOCUMENTS

| | | | |
|---|---|---|---|
| 2016/0169349 A1* | 6/2016 | Park | F16H 3/666 475/275 |
| 2016/0169350 A1* | 6/2016 | Park | F16H 3/666 475/275 |
| 2016/0169351 A1* | 6/2016 | Lee | F16H 3/666 475/275 |
| 2016/0169352 A1* | 6/2016 | Lee | F16H 3/666 475/275 |

FOREIGN PATENT DOCUMENTS

KR 10-2013-0003981 A 1/2013

* cited by examiner

*Primary Examiner* — Huan Le
(74) *Attorney, Agent, or Firm* — Brinks Gilson & Lione

(57) ABSTRACT

Disclosed is a transmission for a vehicle that can improve fuel efficiency by implementing multiple steps of shifting and improve vehicle driving comfort by using operating points in a low RPM range of an engine. According to the transmission, since three single planetary gear sets and one compound planetary gear set are combined or five single planetary gear sets are compound and the rotary elements of the planetary gear sets and friction members are selectively connected and disconnected, their rotational speeds and directions are changed when shifting is performed. Therefore, a vehicle can be driven with the gear ratios of ten or more steps of forward shifting and one step of reverse shifting.

14 Claims, 6 Drawing Sheets

FIG. 3

| GEAR | B1 | B2 | C1 | C2 | C3 | C4 | SPEED |
|------|----|----|----|----|----|----|-------|
| 1ST  | ●  | ●  | ●  |    |    |    | 5.000 |
| 2ND  | ●  | ●  |    | ●  |    |    | 2.778 |
| 3RD  |    | ●  | ●  | ●  |    |    | 1.923 |
| 4TH  |    | ●  |    | ●  |    | ●  | 1.667 |
| 5TH  |    | ●  | ●  |    |    | ●  | 1.471 |
| 6TH  |    | ●  |    |    | ●  | ●  | 1.126 |
| 7TH  |    |    |    | ●  | ●  | ●  | 1.000 |
| 8TH  | ●  |    |    |    | ●  | ●  | 0.817 |
| 9TH  | ●  |    | ●  |    |    | ●  | 0.610 |
| 10TH | ●  |    |    | ●  |    | ●  | 0.556 |
| R1   | ●  | ●  |    |    | ●  |    | -4.630 |

FIG. 6

| GEAR | B1 | B2 | C1 | C2 | C3 | C4 | SPEED |
|---|---|---|---|---|---|---|---|
| 1ST | ● | ● | ● | | | | 4.600 |
| 2ND | ● | ● | | ● | | | 2.556 |
| 3RD | | ● | | ● | ● | | 1.840 |
| 4TH | | ● | | ● | | ● | 1.622 |
| 5TH | | ● | ● | | | ● | 1.434 |
| 6TH | | ● | | | ● | ● | 1.114 |
| 7TH | | | ● | | ● | ● | 1.000 |
| 8TH | ● | | | | ● | ● | 0.817 |
| 9TH | ● | | ● | | | ● | 0.610 |
| 10TH | ● | | | ● | | ● | 0.556 |
| R1 | ● | ● | | | ● | | −4.259 | ns # TRANSMISSION FOR VEHICLES

CROSS REFERENCE TO RELATED APPLICATION

This application claims priority to and the benefit of Korean Patent Application No. 10-2017-0077039, filed on Jun. 19, 2017, which is incorporated herein by reference in its entirety.

FIELD

The present disclosure relates to a transmission for a vehicle that can improve fuel efficiency by implementing multiple steps of shifting and improve vehicle driving comfort.

BACKGROUND

The statements in this section merely provide background information related to the present disclosure and may not constitute prior art.

Recently, increasing oil prices have caused vehicle manufacturers all over the world to rush into infinite competition. Particularly in the case of engines, manufacturers have been pursuing efforts to reduce the weight and improve fuel efficiency of vehicles by reducing engine size, etc.

As for an automatic transmission, there are various methods of improving fuel efficiency, and operability and competitiveness in fuel efficiency can both be secured by implementing multiple steps of shifting.

However, when the shift ranges increase, the number of parts in an automatic transmission also increases, so the automatic transmission may be difficult to mount, the manufacturing cost and weight may be increased, and power transmission efficiency may be deteriorated.

Accordingly, in order to increase the effect of improving fuel efficiency through multiple steps of shifting, we have discovered that it may be important to develop a gear train structure that can achieve maximum efficiency with fewer parts.

The foregoing is intended merely to aid in the understanding of the background of the present disclosure, and is not intended to mean that the present disclosure falls within the purview of the related art that is already known to those skilled in the art.

SUMMARY

The present disclosure proposes a transmission for a vehicle that can improve fuel efficiency by implementing multiple steps of shifting and improve vehicle driving comfort by using operating points in a low RPM range of an engine.

A transmission for a vehicle according to an aspect of the present disclosure includes: a first planetary gear set, a second planetary gear set, a third planetary gear set, and a compound planetary gear set, each of which each includes first, second, third or more rotary elements, and a plurality of friction members. In particular, the first rotary element of the first planetary gear set is selectively connected to a stationary member and also fixedly connected to the first rotary element of the second planetary gear set, the second rotary element of the first planetary gear set is fixedly connected to the third rotary element of the compound planetary gear set, and the third rotary element of the first planetary gear set is selectively connected to the stationary member.

The second rotary element of the second planetary gear set is fixedly connected to an input shaft and the second rotary element of the third planetary gear set, and the third rotary element of the second planetary gear set is selectively connected to the first rotary element of the third planetary gear set, selectively connected to the third rotary element of the third planetary gear set, and selectively connected to a fourth rotary element of the compound planetary gear set. The first rotary element of third planetary gear set is fixedly connected to the first rotary element of the compound planetary gear set, the second rotary element of the compound planetary gear set is fixedly connected to an output shaft, and the friction members are connected to at least one rotary element selected from the rotary elements of the first, second, third, and compound planetary gear sets and control rotation of the corresponding rotary elements selected from the rotary elements of the first, second, third and compound planetary gear sets.

The first rotary elements may be sun gears, the second rotary elements may be carriers, and the third rotary elements may be ring gears in the first to third planetary gear sets, and the first rotary element may be a sun gear, the second rotary elements may be a carrier, and the third and fourth rotary elements may be ring gears engaged with the carrier in the compound planetary gear set.

The compound planetary gear set may include a fourth planetary gear set and a fifth planetary gear set, in which the first rotary element of the compound planetary gear set may be formed by fixedly connecting a sun gear of the fourth planetary gear set and a sun gear of the fifth planetary gear set to each other, the second rotary element of the compound planetary gear set may be formed by fixedly connecting a carrier of the fourth planetary gear set and a carrier of the fifth planetary gear set to each other, the third rotary element of the compound planetary gear set may be a ring gear of the fourth planetary gear set, and the fourth rotary element of the compound planetary gear set may be a ring gear of the fifth planetary gear set.

The second rotary element of the second planetary gear set and the first rotary element of the third planetary gear set may be selectively connected to each other.

The friction members may include: a first brake disposed for connecting and disconnecting the stationary member (e.g., a transmission case) and the first rotary element of the first planetary gear set; a second brake disposed for connecting and disconnecting the third rotary element of the first planetary gear set and the transmission case; a first clutch disposed for connecting and disconnecting the second rotary element of the second planetary gear set and the first rotary element of the third planetary gear set; a second clutch disposed for connecting and disconnecting the third rotary element of the second planetary gear set and the first rotary element of the third planetary gear set; a third clutch disposed for connecting and disconnecting the third rotary element of the second planetary gear set and the third rotary element of the third planetary gear set; and a fourth clutch disposed for connecting and disconnecting the third rotary element of the second planetary gear set and the fourth rotary element of the compound planetary gear set.

The second rotary element of the second planetary gear set and the third rotary element of the third planetary gear set may be selectively connected to each other.

The friction members may include: a first brake disposed for connecting and disconnecting a transmission case and the first rotary element of the first planetary gear set; a second brake disposed for connecting and disconnecting the third rotary element of the first planetary gear set and the transmission case; a first clutch disposed for connecting and disconnecting the second rotary element of the second planetary gear set and the third rotary element of the third planetary gear set; a second clutch disposed for connecting and disconnecting the third rotary element of the second planetary gear set and the first rotary element of the third planetary gear set; a third clutch disposed for connecting and disconnecting the third rotary element of the second planetary gear set and the third rotary element of the third planetary gear set; and a fourth clutch disposed for connecting and disconnecting the third rotary element of the second planetary gear set and the fourth rotary element of the compound planetary gear set.

A transmission for a vehicle according to another aspect of the present disclosure includes: a first planetary gear set, a second planetary gear set, a third planetary gear set, and a compound planetary gear set each of which includes first, second, third or more rotary elements; an input shaft connected to the second rotary element of the second planetary gear set, a first clutch, and the second rotary element of the third planetary gear set; a first shaft connected to a first brake, the first rotary element of the first planetary gear set, and the first rotary element of the second planetary gear set; a second shaft connected to a second brake and the third rotary element of the first planetary gear set; a third shaft connected to the second rotary element of the first planetary gear set and the third rotary element of the compound planetary gear set; a fourth shaft connected to the third rotary element of the second planetary gear set, a second clutch, a third clutch, and a fourth clutch; a fifth shaft connected to the second clutch, the first rotary element of the third planetary gear set, and the first rotary element of the compound planetary gear set; a sixth shaft connected to the third clutch and the third rotary element of the third planetary gear set; a seventh shaft connected to the fourth clutch and the fourth rotary element of the compound planetary gear set; and an output shaft connected to the second rotary element of the compound planetary gear set.

The first clutch may be further connected to the fifth shaft.

The first brake may be disposed for connecting and disconnecting the first shaft and a transmission case, the second brake may be disposed for connecting and disconnecting the second shaft and the transmission case, the first clutch may be disposed for connecting and disconnecting the input shaft and the fifth shaft, the second clutch may be disposed for connecting and disconnecting the fourth shaft and the fifth shaft, the third clutch may be disposed for connecting and disconnecting the fourth shaft and the sixth shaft, and the fourth clutch may be disposed for connecting and disconnecting the fourth shaft and the seventh shaft.

The first brake is disposed for connecting and disconnecting the first rotary element of the first planetary gear set and the transmission case, the second brake is disposed for connecting and disconnecting the third rotary element of the first planetary gear set and the transmission case, the first clutch is disposed for connecting and disconnecting the second rotary element of the second planetary gear set and the first rotary element of the third planetary gear set, the second clutch is disposed for connecting and disconnecting the third rotary element of the second planetary gear set and the third rotary element of the third planetary gear set, and the fourth clutch is disposed for connecting and disconnecting the third rotary element of the second planetary gear set and the fourth rotary element of the compound planetary gear set.

The first clutch may be further connected to the sixth shaft.

The first brake may be disposed for connecting and disconnecting the first shaft and a transmission case, the second brake may be disposed for connecting and disconnecting the second shaft and the transmission case, the first clutch may be disposed for connecting and disconnecting the input shaft and the sixth shaft, the second clutch may be disposed for connecting and disconnecting the fourth shaft and the fifth shaft, the third clutch may be disposed for connecting and disconnecting the fourth shaft and the sixth shaft, and the fourth clutch may be disposed for connecting and disconnecting the fourth shaft and the seventh shaft.

The first brake is disposed for connecting and disconnecting the first rotary element of the first planetary gear set and the transmission case, the second brake is disposed for connecting and disconnecting the third rotary element of the first planetary gear set and the transmission case, the first clutch is disposed for connecting and disconnecting the second rotary element of the second planetary gear set and the third rotary element of the third planetary gear set, the second clutch is disposed for connecting and disconnecting the third rotary element of the second planetary gear set and the first rotary element of the third planetary gear set, the third clutch is disposed for connecting and disconnecting the third rotary element of the second planetary gear set and the third rotary element of the third planetary gear set, and the fourth clutch is disposed for connecting and disconnecting the third rotary element of the second planetary gear set and the fourth rotary element of the compound planetary gear set.

According to the present disclosure, since three single planetary gear sets and one compound planetary gear set CPG are combined or five single planetary gear sets are compound and the rotary elements of the planetary gear sets and friction members are selectively connected and disconnected, their rotational speeds and directions are changed when shifting is performed. Therefore, a vehicle can be driven with the gear ratios of ten or more steps of forward shifting and one step of reverse shifting. Therefore, it is possible to improve fuel efficiency by implementing multiple steps of shifting and improve vehicle driving comfort by using operating points in a low RPM range of an engine.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 3 is a table showing operation at each gear stage of the transmission according to the first form of the present disclosure;

FIG. 6 is a table showing operation at each gear stage of the transmission according to the second form of the present disclosure.

Figure 1:
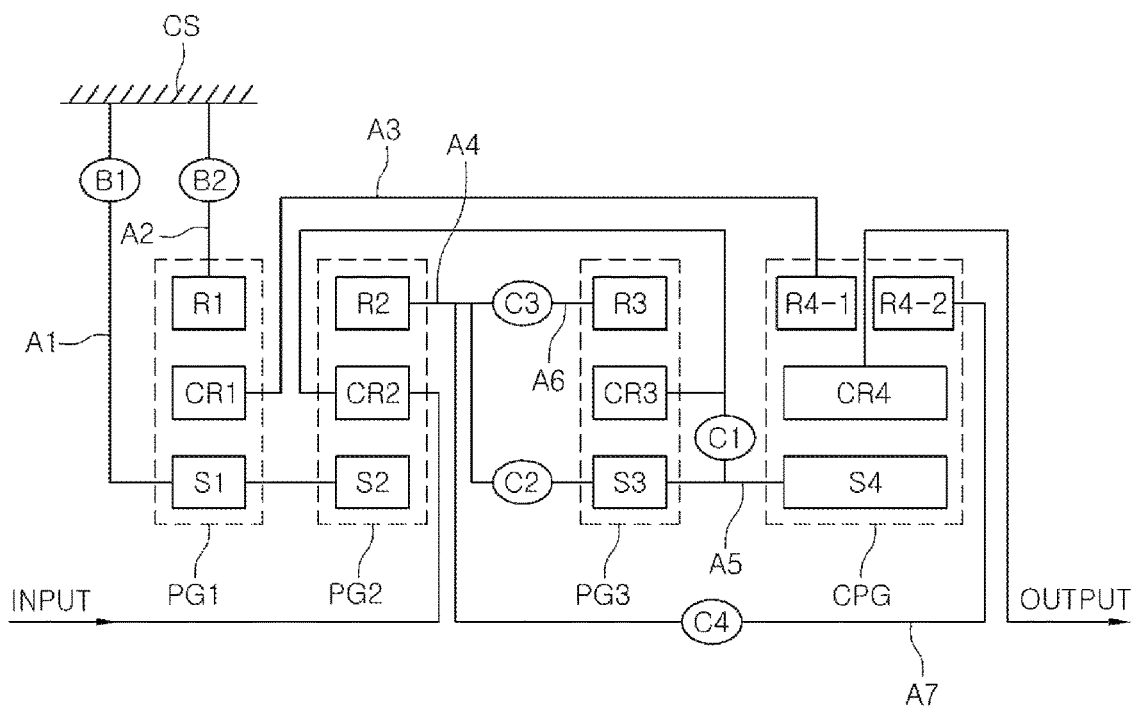
FIG. 1 is an exemplary diagram showing the configuration of a transmission for a vehicle according to a first form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Here, the term "fixedly connected" or the like means at least two members are connected to each other to always rotate together. Therefore, it is to be understood by a person of an ordinary skill in the art that the term "fixedly connected" or the like differs from the term "operably connected" or the like.

A transmission for a vehicle according to one form of the present disclosure may include: a first planetary gear set PG1, a second planetary gear set PG2, a third planetary gear set PG3, and a compound planetary gear set CPG. The planetary gear sets each may include three or more rotary elements.

Figure 2:
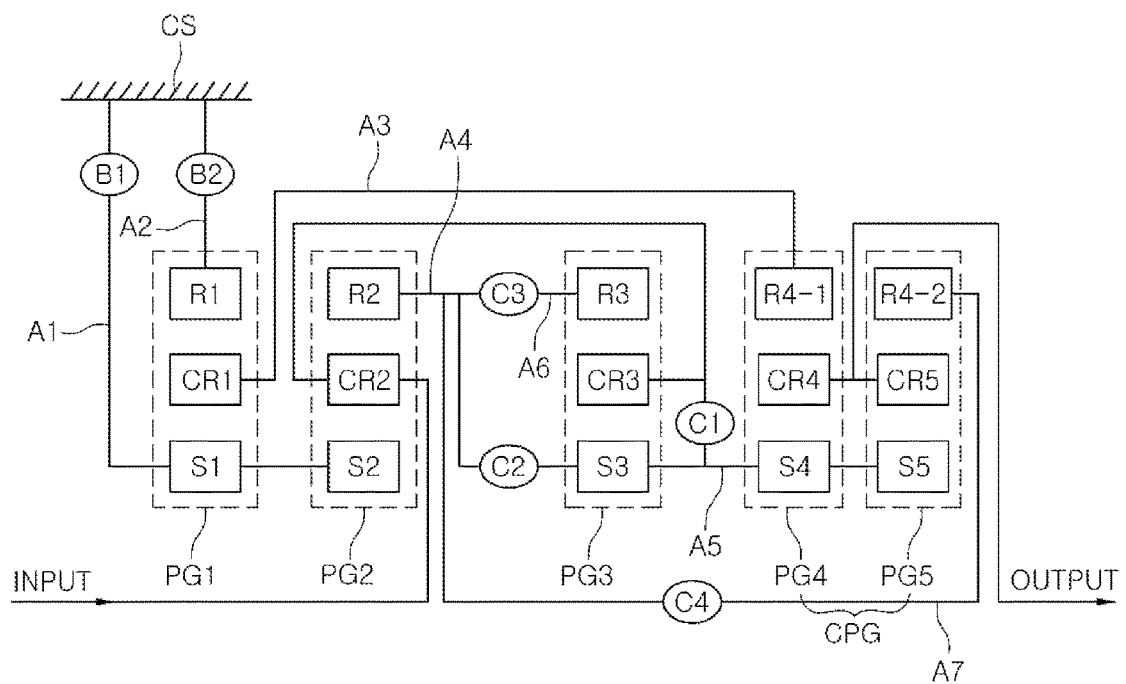
FIG. 2 is an exemplary view showing a modification of the compound planetary gear set in the first form shown in FIG. 1.

FIGS. 1 and 2 are exemplary views showing the configuration of a transmission for a vehicle according to a first form of the present disclosure. Referring to the figures, a first rotary element of the first planetary gear set PG1 may operate as an element to be selectively connected to a stationary member (e.g., a transmission housing), and also may be fixedly connected to the first rotary element of the second planetary gear set PG2.

For example, the first rotary element of the first planetary gear set PG1 may be a first sun gear S1, and the first sun gear S1 can be selectively connected to a transmission case CS by a friction member (e.g., a brake B1).

The first rotary element of the second planetary gear set PG2 may be a second sun gear S2, and the first sun gear 1 and the second sun gear S2 may be fixedly connected to each other.

In one form, the first planetary gear set PG1, the second planetary gear set PG2, and the third planetary gear set PG3 may be single pinion planetary gear sets, and each include first, second, third rotary elements. Here, the first rotary elements of the three planetary gear sets (PG1, PG2, PG3) may be first, second, and third sun gears (S1, S2, S3), the second rotary elements may be first, second, and third carriers (CR1, CR2, CR3), and third rotary elements may be first, second, and third ring gears (R1, R2, R3), respectively.

The second rotary element of the first planetary gear set PG1 may be fixedly connected to the third rotary element of the compound planetary gear set CPG.

For example, the second rotary element of the first planetary gear set PG1 may be a first carrier CR1, the third rotary element of the compound planetary gear set CPG may be a 4-1th ring gear R4-1 in FIG. 1 and may be a fourth ring gear R4 in FIG. 2. The first carrier CR1 and the 4-1th ring gear R4-1, or the first carrier CR1 and the fourth ring gear R4 may be fixedly connected to each other.

As for the compound planetary gear set CPG, the compound planetary gear set CPG may be a single planetary gear set, as in FIG. 1, or it may be composed of two planetary gear sets, as in FIG. 2.

For example, referring to FIG. 1, in the compound planetary gear set CPG, the first rotary element may be a fourth sun gear S4, the second rotary element may be a fourth carrier CR4, and the third rotary element and the fourth rotary element may be the 4-1th ring gear R4-1 and the 4-2th ring gear R4-2 engaged with the fourth carrier CR4.

Further, referring to FIG. 2, the compound planetary gear set CPG may be composed of a fourth planetary gear set PG4 and a fifth planetary gear set PG5 that are single pinion planetary gear sets.

That is, the first rotary element of the compound planetary gear set CPG may be formed by fixedly connecting the fourth sun gear S4 of the fourth planetary gear set PG4 and the fifth sun gear S5 of the fifth planetary gear set PG5 to each other.

Further, the second rotary element of the compound planetary gear set CPG may be formed by fixedly connecting the fourth carrier CR4 of the fourth planetary gear set PG4 and the fifth carrier CR5 of the fifth planetary gear set PG5 to each other.

Further, the third rotary element of the compound planetary gear set CPG may be the fourth ring gear R4 of the fourth planetary gear set PG4 and the fourth rotary element of the compound planetary gear set CPG may be the fifth ring gear R5 of the fifth planetary gear set PG5.

These modifications of the compound planetary gear set CPG can be applied to the transmission structure according to a second form described below, so the structure of the compound planetary gear set CPG is not described in the following description.

Further, the third rotary element of the first planetary gear set PG1 may operate as an element selectively connected to a stationary member (e.g., the transmission housing).

For example, the third rotary element of the first planetary gear set PG1 may be a first ring gear R1 and the first ring gear R1 can be selectively connected to the transmission case CS by a friction member (e.g., a brake B2).

Further, in the transmission structure according to the first form shown in FIGS. 1 and 2, the second rotary element CR2 of the second planetary gear set PG2 may be fixedly connected to an input shaft INPUT, may be fixedly connected to the second rotary element CR3 of the third planetary gear set PG3, and may be selectively connected to the first rotary element S3 of the third planetary gear set PG3.

For example, the second rotary element of the second planetary gear set PG2 may be a second carrier CR2 and the second carrier CR2 may operate as a constant input element by being fixedly connected to the input shaft INPUT.

Further, the second rotary element of the third planetary gear set PG3 may be a third carrier CR3, and the second carrier CR2 and the third carrier CR3 may be fixedly connected to each other.

Further, the first rotary element of the third planetary gear set PG3 may be a third sun gear S3, and the second carrier CR2 and the third sun gear S3 can be connected to each other to be disconnectable.

The third rotary element of the second planetary gear set PG2 may be selectively connected to the first rotary element of the third planetary gear set PG3, may be selectively connected to the third rotary element of the third planetary gear set PG3, and may be selectively connected to the fourth rotary element of the compound planetary gear set CPG.

For example, the third rotary element of the second planetary gear set PG2 may be a second ring gear R2, the first rotary element of the third planetary gear set PG3 may be a third sun gear S3, and the second ring gear R2 and the third sun gear S3 can be connected to each other to be disconnectable by a friction member.

Further, the third rotary element of the third planetary gear set PG3 may be a third ring gear R3, and the second ring gear R2 and the third ring gear R3 can be connected to each other to be disconnectable by a friction member.

Further, the fourth rotary element of the compound planetary gear set CPG may be the 4-2th ring gear R4-2 in FIG. 1 and may be the fifth ring gear R5 in FIG. 2, and the second ring gear R2 and the 4-2th ring gear R4-2, or the second ring gear R2 and the fifth ring gear R5 can be connected to each other to be disconnectable by a friction member.

Further, the first rotary element of the third planetary gear set PG3 and the first rotary element of the compound planetary gear set CPG may be fixedly connected to each other.

For example, the first rotary element of the third planetary gear set PG3 may be a third sun gear S3, the first rotary element of the compound planetary gear set CPG may be a fourth sun gear S4, and the third sun gear S3 and the fourth sun gear S4 may be fixedly connected to each other.

Further, the second rotary element of the compound planetary gear set CPG may be fixedly connected to an output shaft OUTPUT.

For example, the fourth carrier CR4 may be fixedly connected to the output shaft OUTPUT in FIG. 2, and the fourth carrier CR4 and the fifth carrier CR5 may be fixedly connected to the output shaft OUTPUT in FIG. 2.

Further, in the transmission for a vehicle having this configuration, the first planetary gear set PG1, second planetary gear set PG2, third planetary gear set PG3, and compound planetary gear set CPG may be sequentially arranged in the axial direction of the input shaft INPUT and the output shaft OUTPUT.

The transmission structure according to the first form of the present disclosure may further include a plurality of friction members connected to at least one or more of the rotary elements of the planetary gear sets and controlling rotation of the rotary elements. The friction members may be first and second brakes B1 and B2 and first, second, third, and fourth clutches C1, C2, C3, and C4.

In detail, the first brake B1 may be disposed for connection/disconnection between the first sun gear S1, which is the first rotary element of the first planetary gear set PG1, and the transmission case CS.

The second brake B2 may be disposed for connection/disconnection between the first ring gear R1, which is the third rotary element of the first planetary gear set PG1, and the transmission case CS.

The first clutch C1 may be disposed for connection/disconnection between the second carrier CR2 that is the second rotary element of the second planetary gear set PG2 and the third sun gear S3 that is the first rotary element of the third planetary gear set PG3.

The second clutch C2 may be disposed for connection/disconnection between the second ring gear S2 that is the third rotary element of the second planetary gear set PG2 and the third sun gear S3 that is the first rotary element of the third planetary gear set PG3.

The third clutch C3 may be disposed for connection/disconnection between the second ring gear R2 that is the third rotary element of the second planetary gear set PG2 and the third ring gear R3 that is the third rotary element of the third planetary gear set PG3.

The fourth clutch C4 may be disposed for connection/disconnection between the second ring gear R2 that is the third rotary element of the second planetary gear set PG2 and the 4-2th ring gear R4-2 or the fifth ring gear R5 that is the fourth rotary element of the compound planetary gear set CPG.

Further, in the transmission for a vehicle according to the first form of the present disclosure, the rotary elements of the planetary gear sets may be connected to the input shaft INPUT, a first shaft A1 to a seventh shaft A7, and the output shaft OUTPUT.

Referring to FIGS. 1 and 2, the second rotary element of the second planetary gear set PG2, a first side of the first clutch C1, and the second rotary element of the third planetary gear set PG3 may be connected to the input shaft INPUT.

The first brake B1, the first rotary element of the first planetary gear set PG1, and the first rotary element of the second planetary gear set PG2 may be connected to the first shaft A1.

The second brake B2 and the third rotary element of the first planetary gear set PG1 may be connected to the second shaft A2.

The second rotary element of the first planetary gear set PG1 and the third rotary element of the compound planetary gear set may be connected to the third shaft A3.

The third rotary element of the second planetary gear set PG2, a first side of the second clutch C2, a first side of the third clutch C3, and a first side of the fourth clutch C4 may be connected to the fourth shaft A4.

A second side of the second clutch C2, the first rotary element of the third planetary gear set PG3, and the first rotary element of the compound planetary gear set CPG may be connected to the fifth shaft A5. Further, a second side of the first clutch C1 may be connected to the fifth shaft A5.

A second side of the third clutch C3 and the third rotary element of the third planetary gear set PG3 may be connected to the sixth shaft A6.

A second side of the fourth clutch C4 and the fourth rotary element of the compound planetary gear set CPG may be connected to the seventh shaft A7.

The second rotary element of the compound planetary gear set CPG may be connected to the output shaft OUTPUT.

The first brake B1 and the second brake B2 may be connected to the transmission case CS.

For example, the first brake B1 may be disposed for connection/disconnection between the first shaft A1 and transmission case CS, the second brake B2 may be disposed for connection/disconnection between the second shaft A2 and transmission case CS, and the first clutch C1 may be disposed for connection/disconnection between the input shaft INPUT and the fifth shaft A5.

Further, the second clutch C2 may be disposed for connection/disconnection between the fourth shaft A4 and the fifth shaft A5, the third clutch C3 may be disposed between the fourth shaft A4 and the sixth shaft A6, and the fourth clutch C4 may be disposed for connection/disconnection between the fourth shaft A4 and the seventh shaft A7.

FIG. 3 is a table showing operation at each gear of a transmission for a vehicle according to the first form of the present disclosure, in which, for example, in order to implement a first-gear ratio, the first brake B1, second brake B2, and first clutch C1 can be connected and the other friction members may be all disconnected.

In order to implement a third-gear ratio, the second brake B2, first clutch C1, and second clutch C2 can be connected and the other friction elements may be all disconnected. Further, as for the other gear stages, a vehicle can be driven with the gear ratios corresponding to the gear stages by connecting/disconnecting, as shown in the table.

Figure 4:
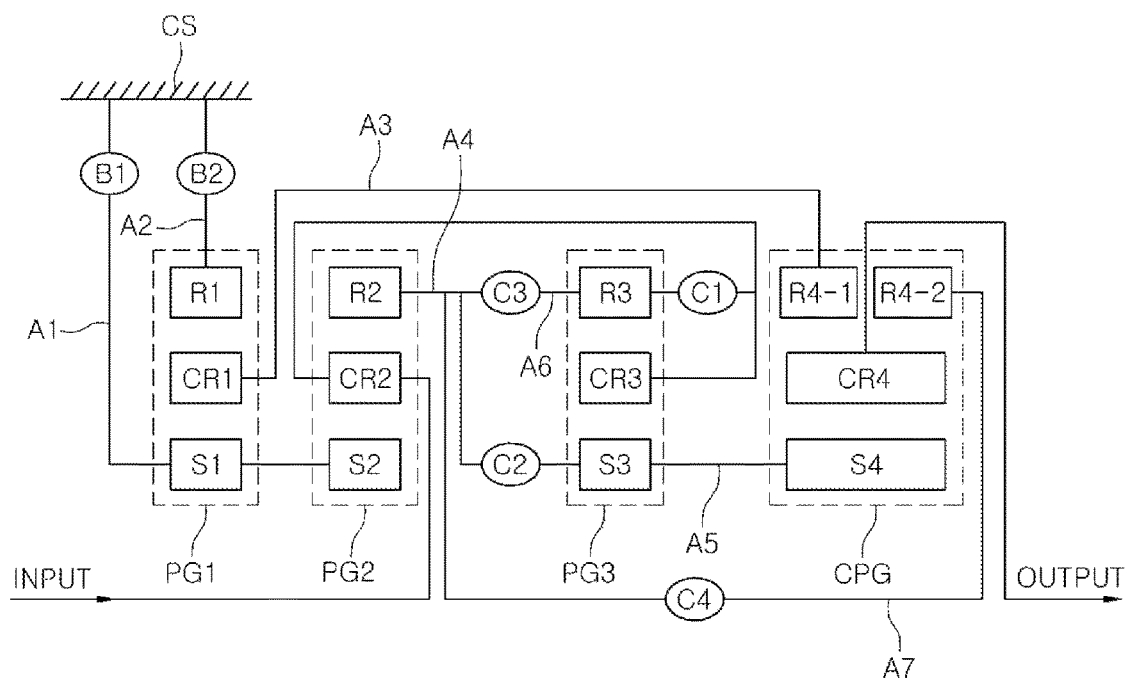
FIG. 4 is an exemplary diagram showing the configuration of a transmission for a vehicle according to a second form of the present disclosure.
Figure 5:
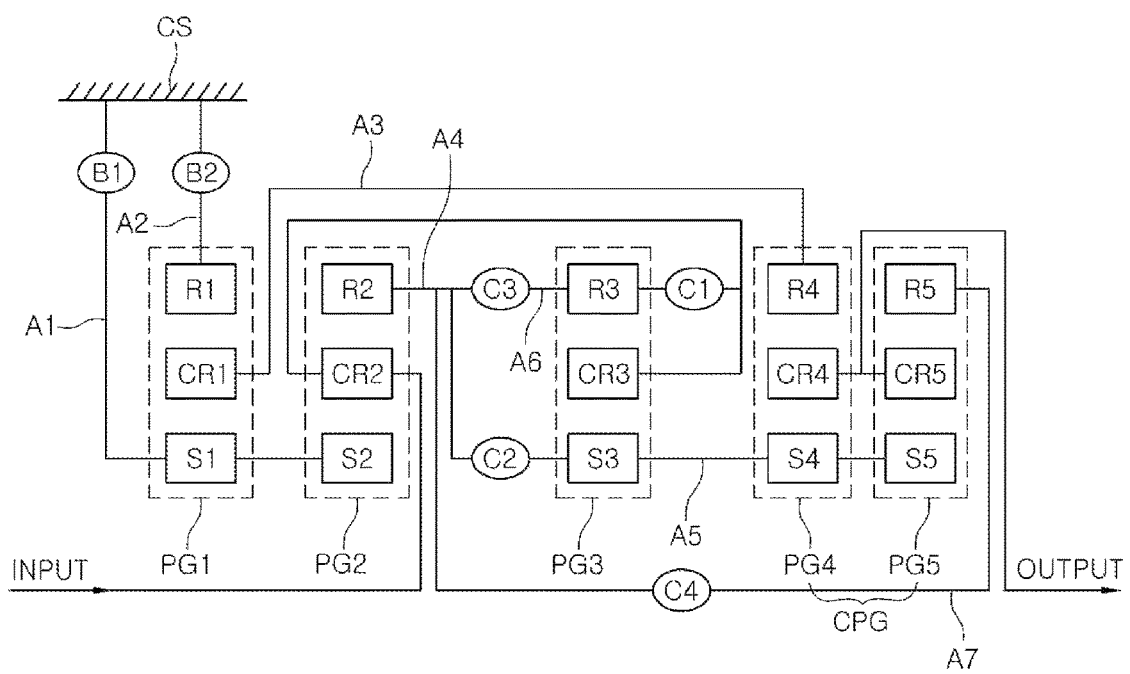
FIG. 5 is an exemplary view showing a modification of the compound planetary gear set in the second form shown in FIG. 4.

FIGS. 4 and 5 are exemplary views showing the configuration of a transmission for a vehicle according to a second form of the present disclosure. Referring to the figures, a first rotary element of the first planetary gear set PG1 may operate as an element selectively connected to a stationary member (e.g., a transmission housing) and also fixedly connected to the first rotary element of the second planetary gear set PG2.

For example, the first rotary element of the first planetary gear set PG1 may be a first sun gear S1 and the first sun gear S1 can be connected to a transmission case CS to be disconnectable by a friction member.

The first rotary element of the second planetary gear set PG2 may be a second sun gear S2, and the first sun gear 1 and the second sun gear S2 may be fixedly connected to each other.

The first planetary gear set PG1, the second planetary gear set PG2, and the third planetary gear set PG3 that is described below are single pinion planetary gear sets, in which the first rotary elements of the first, second and third planetary gear sets may be first, second, and third sun gears, the second rotary elements of the first, second and third planetary gear sets may be first, second, and third carriers, and third rotary elements of the first, second and third planetary gear sets may be first, second, and third ring gears, respectively.

The second rotary element of the first planetary gear set PG1 may be fixedly connected to the third rotary element of the compound planetary gear set CPG.

For example, the second rotary element of the first planetary gear set PG1 may be a first carrier CR1, the third rotary element of the compound planetary gear set CPG may be a 4-1th ring gear R4-1 in FIG. 4 and may be a fourth ring gear R4 in FIG. 5. The first carrier CR1 and the 4-1th ring gear R4-1, or the first carrier CR1 and the fourth ring gear R4 may be fixedly connected to each other.

Further, the third rotary element of the first planetary gear set PG1 may operate as an element selectively connected to a stationary member (e.g., the transmission housing).

For example, the third rotary element of the first planetary gear set PG1 may be a first ring gear R1 and the first ring gear R1 can be connected to the transmission case CS to be disconnectable by a friction member.

Further, in the transmission structure according to the second form shown in FIGS. 4 and 5, the second rotary element of the second planetary gear set PG2 may be fixedly connected to an input shaft INPUT, may be fixedly connected to the second rotary element of the third planetary gear set PG3, and may be selectively connected to the third rotary element of the third planetary gear set PG3.

For example, the second rotary element of the second planetary gear set PG2 may be a second carrier CR2 and the second carrier CR2 may operate as a constant input element by being fixedly connected to the input shaft INPUT.

Further, the second rotary element of the third planetary gear set PG3 may be a third carrier CR3, and the second carrier CR2 and the third carrier CR3 may be fixedly connected to each other.

Further, the third rotary element of the third planetary gear set PG3 may be a third ring gear R3, and the second carrier CR2 and the third ring gear R3 may be connected to each other to be disconnectable.

The third rotary element of the second planetary gear set PG2 may be selectively connected to the first rotary element of the third planetary gear set PG3, may be selectively connected to the third rotary element of the third planetary gear set PG3, and may be selectively connected to the fourth rotary element of the compound planetary gear set CPG.

For example, the third rotary element of the second planetary gear set PG2 may be a second ring gear R2, the first rotary element of the third planetary gear set PG3 may be a third sun gear S3, and the second ring gear R2 and the third sun gear S3 may be connected to each other to be disconnectable by a friction member.

Further, the third rotary element of the third planetary gear set PG3 may be a third ring gear R3, and the second ring gear R2 and the third ring gear R3 may be connected to each other to be disconnectable by a friction member.

Further, the fourth rotary element of the compound planetary gear set CPG may be the 4-2th ring gear R4-2 in FIG. 4 and may be the fifth ring gear R5 in FIG. 5, and the second ring gear R2 and the 4-2th ring gear R4-2, or the second ring gear R2 and the fifth ring gear R5 may be connected to each other to be disconnectable by a friction member.

Further, the first rotary element of the third planetary gear set PG3 and the first rotary element of the compound planetary gear set CPG may be fixedly connected to each other.

For example, the first rotary element of the third planetary gear set PG3 may be a third sun gear S3, the first rotary element of the compound planetary gear set CPG may be a fourth sun gear S4, and the third sun gear S3 and the fourth sun gear S4 may be fixedly connected to each other.

Further, the second rotary element of the compound planetary gear set CPG may be fixedly connected to an output shaft OUTPUT.

For example, the fourth carrier CR4 may be fixedly connected to the output shaft OUTPUT in FIG. 4, and the fourth carrier CR4 and the fifth carrier CR5 may be fixedly connected to the output shaft OUTPUT in FIG. 5.

Further, in the transmission for a vehicle having this configuration, the first planetary gear set PG1, second planetary gear set PG2, third planetary gear set PG3, and compound planetary gear set CPG may be sequentially arranged in the axial direction of the input shaft INPUT and the output shaft OUTPUT.

The transmission structure according to the second form of the present disclosure may further include a plurality of friction members connected to at least one or more of the rotary elements of the planetary gear sets and controlling rotation of the rotary elements. The friction members may be first and second brakes B1 and B2 and first, second, third, and fourth clutches C1, C2, C3, and C4.

In detail, the first brake B1 may be disposed for connection/disconnection between the first sun gear S1, which is the first rotary element of the first planetary gear set PG1, and the transmission case CS.

The second brake B2 may be disposed for connection/disconnection between the first ring gear R1, which is the third rotary element of the first planetary gear set PG1, and the transmission case CS.

The first clutch C1 may be disposed for connection/disconnection between the second carrier CR2 that is the second rotary element of the second planetary gear set PG2 and the third ring gear R3 that is the third rotary element of the third planetary gear set PG3.

The second clutch C2 may be disposed for connection/disconnection between the second ring gear S2 that is the third rotary element of the second planetary gear set PG2 and the third sun gear S3 that is the first rotary element of the third planetary gear set PG3.

The third clutch C3 may be disposed for connection/disconnection between the second ring gear R2 that is the third rotary element of the second planetary gear set PG2 and the third ring gear R3 that is the third rotary element of the third planetary gear set PG3.

The fourth clutch C4 may be disposed for connection/disconnection between the second ring gear R2 that is the third rotary element of the second planetary gear set PG2 and the 4-2th ring gear R4-2 or the fifth ring gear R5 that is the fourth rotary element of the compound planetary gear set CPG.

Further, in the transmission for a vehicle according to the second form of the present disclosure, the rotary elements of the planetary gear sets may be connected to the input shaft INPUT, a first shaft A1 to a seventh shaft A7, and the output shaft OUTPUT.

Referring to FIGS. 4 and 5, the second rotary element of the second planetary gear set PG2, a first end of the first clutch C1, and the second rotary element of the third planetary gear set PG3 may be connected to the input shaft INPUT.

The first brake B1, the first rotary element of the first planetary gear set PG1, and the first rotary element of the second planetary gear set PG2 may be connected to the first shaft A1.

The second brake B2 and the third rotary element of the first planetary gear set PG1 may be connected to the second shaft A2.

The second rotary element of the first planetary gear set PG1 and the third rotary element of the compound planetary gear set may be connected to the third shaft A3.

The third rotary element of the second planetary gear set PG2, a first side of the second clutch C2, a first side of the third clutch C3, and a first side of the fourth clutch C4 may be connected to the fourth shaft A4.

A second side of the second clutch C2, the first rotary element of the third planetary gear set PG3, and the first rotary element of the compound planetary gear set CPG may be connected to the fifth shaft A5.

A second side of the third clutch C3, the third rotary element of the third planetary gear set PG3, and a second side of the first clutch C1 may be connected to the sixth shaft A6.

A second side of the fourth clutch C4 and the fourth rotary element of the compound planetary gear set CPG may be connected to the seventh shaft A7.

The second rotary element of the compound planetary gear set CPG may be connected to the output shaft OUTPUT.

The first brake B1 and the second brake B2 may be connected to the transmission case CS.

For example, the first brake B1 may be disposed for connection/disconnection between the first shaft A1 and transmission case CS, the second brake B2 may be disposed for connection/disconnection between the second shaft A2 and transmission case CS, and the first clutch C1 may be disposed for connection/disconnection between the input shaft INPUT and the sixth shaft A6.

Further, the second clutch C2 may be disposed for connection/disconnection between the fourth shaft A4 and the fifth shaft A5, the third clutch C3 may be disposed between the fourth shaft A4 and the sixth shaft A6, and the fourth clutch C4 may be disposed for connection/disconnection between the fourth shaft A4 and the seventh shaft A7.

FIG. 6 is a table showing operation at each gear of a transmission for a vehicle according to the second form of the present disclosure, in which, for example, in order to implement a first-gear ratio, the first brake B1, second brake B2, and first clutch C1 may be connected and the other friction members may be all disconnected.

In order to implement a third-gear ratio, the second brake B2, second clutch C2, and third clutch C3 may be connected and the other friction elements may be all disconnected. Further, as for the other gear stages, a vehicle can be driven with the gear ratios corresponding to the gear stages by connecting/disconnecting, as shown in the table.

As described above, since three single planetary gear sets and one compound planetary gear set CPG are combined or five single planetary gear sets are compound and the rotary elements of the planetary gear sets and friction members are selectively connected and disconnected, their rotational speeds and directions are changed when shifting is performed. Therefore, a vehicle can be driven with the gear ratios of ten or more steps of forward shifting and one step of reverse shifting. Therefore, it is possible to improve fuel efficiency by implementing multiple steps of shifting and improve vehicle driving comfort by using operating points in a low RPM range of an engine.

Although exemplary forms of the present disclosure have been described for illustrative purposes, those skilled in the art will appreciate that various modifications, additions and substitutions are possible, without departing from the scope and spirit of the present disclosure.

What is claimed is:

1. A transmission for a vehicle, comprising: a first planetary gear set, a second planetary gear set, a third planetary gear set, and a compound planetary gear set, each of which includes at least first, second and third rotary elements, the transmission further including a plurality of friction members,
wherein the first rotary element of the first planetary gear set is configured to be selectively connected to a stationary member and fixedly connected to the first rotary element of the second planetary gear set, the second rotary element of the first planetary gear set is configured to be fixedly connected to the third rotary element of the compound planetary gear set, and the third rotary element of the first planetary gear set is configured to be selectively connected to the stationary member,
wherein the second rotary element of the second planetary gear set is configured to be fixedly connected to an input shaft and the second rotary element of the third planetary gear set, and the third rotary element of the second planetary gear set is configured to be selectively connected to the first rotary element of the third planetary gear set, selectively connected to the third rotary element of the third planetary gear set, and selectively connected to a fourth rotary element of the compound planetary gear set, and
wherein the first rotary element of the third planetary gear set is configured to be fixedly connected to the first rotary element of the compound planetary gear set,
the second rotary element of the compound planetary gear set is configured to be fixedly connected to an output shaft, and the friction members are each connected to at least one rotary element selected from the rotary elements of the first, second, third and compound planetary gear sets and is configured to control rotation of corresponding rotary elements selected from the rotary elements of the first, second, third and compound planetary gear sets.

2. The transmission of claim 1, wherein in the first to third planetary gear sets, the first rotary elements are sun gears, the second rotary elements are carriers, and the third rotary elements are ring gears, and wherein in the compound planetary gear set, the first rotary element is a sun gear, the second rotary element is a carrier, and the third and fourth rotary elements are ring gears engaged with the carrier of the compound planetary gear set.

3. The transmission of claim 2, wherein the compound planetary gear set includes a fourth planetary gear set and a fifth planetary gear set, wherein the first rotary element of the compound planetary gear set is formed by fixedly connecting a sun gear of the fourth planetary gear set and a sun gear of the fifth planetary gear set to each other, the second rotary element of the compound planetary gear set is formed by fixedly connecting a carrier of the fourth planetary gear set and a carrier of the fifth planetary gear set to each other, the third rotary element of the compound planetary gear set is a ring gear of the fourth planetary gear set, and the fourth rotary element of the compound planetary gear set is a ring gear of the fifth planetary gear set.

4. The transmission of claim 1, wherein the second rotary element of the second planetary gear set and the first rotary element of the third planetary gear set are selectively connected to each other.

5. The transmission of claim 4, wherein the plurality of friction members include:

a first brake disposed for connecting and disconnecting the stationary member and the first rotary element of the first planetary gear set, the stationary member being a transmission case;

a second brake disposed for connecting and disconnecting the third rotary element of the first planetary gear set and the transmission case;

a first clutch disposed for connecting and disconnecting the second rotary element of the second planetary gear set and the first rotary element of the third planetary gear set;

a second clutch disposed for connecting and disconnecting the third rotary element of the second planetary gear set and the first rotary element of the third planetary gear set;

a third clutch disposed for connecting and disconnecting the third rotary element of the second planetary gear set and the third rotary element of the third planetary gear set; and a fourth clutch disposed for connecting and disconnecting the third rotary element of the second planetary gear set and the fourth rotary element of the compound planetary gear set.

6. The transmission of claim 1, wherein the second rotary element of the second planetary gear set and the third rotary element of the third planetary gear set are selectively connected to each other.

7. The transmission of claim 6, wherein the stationary member is a transmission case, wherein the friction members include:

a first brake disposed for connecting and disconnecting the transmission case and the first rotary element of the first planetary gear set;

a second brake disposed for connecting and disconnecting the third rotary element of the first planetary gear set and the transmission case;

a first clutch disposed for connecting and disconnecting the second rotary element of the second planetary gear set and the third rotary element of the third planetary gear set;

a second clutch disposed for connecting and disconnecting the third rotary element of the second planetary gear set and the first rotary element of the third planetary gear set;

a third clutch disposed for connecting and disconnecting the third rotary element of the second planetary gear set and the third rotary element of the third planetary gear set; and a fourth clutch disposed for connecting and disconnecting the third rotary element of the second planetary gear set and the fourth rotary element of the compound planetary gear set.

8. A transmission for a vehicle, comprising:

a first planetary gear set, a second planetary gear set, a third planetary gear set, and a compound planetary gear set, each of which includes at least first, second and third rotary elements;

an input shaft connected to the second rotary element of the second planetary gear set, a first clutch, and the second rotary element of the third planetary gear set;

a first shaft connected to a first brake, the first rotary element of the first planetary gear set, and the first rotary element of the second planetary gear set;

a second shaft connected to a second brake and the third rotary element of the first planetary gear set;

a third shaft connected to the second rotary element of the first planetary gear set and the third rotary element of the compound planetary gear set;

a fourth shaft connected to the third rotary element of the second planetary gear set, a second clutch, a third clutch, and a fourth clutch;

a fifth shaft connected to the second clutch, the first rotary element of the third planetary gear set, and the first rotary element of the compound planetary gear set;

a sixth shaft connected to the third clutch and the third rotary element of the third planetary gear set;

a seventh shaft connected to the fourth clutch and a fourth rotary element of the compound planetary gear set; and an output shaft connected to the second rotary element of the compound planetary gear set.

9. The transmission of claim 8, wherein the first clutch is further connected to the fifth shaft.

10. The transmission of claim 9, wherein the first brake is disposed for connecting and disconnecting the first shaft and a transmission case, the second brake is disposed for connecting and disconnecting the second shaft and the transmission case, the first clutch is disposed for connecting and disconnecting the input shaft and the fifth shaft, the second clutch is disposed for connecting and disconnecting the fourth shaft and the fifth shaft, the third clutch is disposed for connecting and disconnecting the fourth shaft and the sixth shaft, and the fourth clutch is disposed for connecting and disconnecting the fourth shaft and the seventh shaft.

11. The transmission of claim 10, wherein the first brake is disposed for connecting and disconnecting the first rotary element of the first planetary gear set and the transmission case,
the second brake is disposed for connecting and disconnecting the third rotary element of the first planetary gear set and the transmission case,
the first clutch is disposed for connecting and disconnecting the second rotary element of the second planetary gear set and the first rotary element of the third planetary gear set,
the second clutch is disposed for connecting and disconnecting the third rotary element of the second planetary gear set and the first rotary element of the third planetary gear set,
the third clutch is disposed for connecting and disconnecting the third rotary element of the second planetary gear set and the third rotary element of the third planetary gear set, and
the fourth clutch is disposed for connecting and disconnecting the third rotary element of the second planetary gear set and the fourth rotary element of the compound planetary gear set.

12. The transmission of claim 8, wherein the first clutch is further connected to the sixth shaft.

13. The transmission of claim 12, wherein the first brake is disposed for connecting and disconnecting the first shaft and a transmission case,
the second brake is disposed for connecting and disconnecting the second shaft and the transmission case,
the first clutch is disposed for connecting and disconnecting the input shaft and the sixth shaft,
the second clutch is disposed for connecting and disconnecting the fourth shaft and the fifth shaft,
the third clutch is disposed for connecting and disconnecting the fourth shaft and the sixth shaft, and
the fourth clutch is disposed for connecting and disconnecting the fourth shaft and the seventh shaft.

14. The transmission of claim 13, wherein the first brake is disposed for connecting and disconnecting the first rotary element of the first planetary gear set and the transmission case,
the second brake is disposed for connecting and disconnecting the third rotary element of the first planetary gear set and the transmission case,
the first clutch is disposed for connecting and disconnecting the second rotary element of the second planetary gear set and the third rotary element of the third planetary gear set,
the second clutch is disposed for connecting and disconnecting the third rotary element of the second planetary gear set and the first rotary element of the third planetary gear set,
the third clutch is disposed for connecting and disconnecting the third rotary element of the second planetary gear set and the third rotary element of the third planetary gear set, and
the fourth clutch is disposed for connecting and disconnecting the third rotary element of the second planetary gear set and the fourth rotary element of the compound planetary gear set.

* * * * *